(12) United States Patent
Spiesberger (10) Patent No.: US 10,379,218 B1
(45) Date of Patent: Aug. 13, 2019

(54) SELF-LOCATING SYSTEM AND METHODS FOR MULTISTATIC ACTIVE COHERENT SONAR

(71) Applicant: Scientific Innovations, Inc., Radnor, PA (US)

(72) Inventor: John Louis Spiesberger, Radnor, PA (US)

(73) Assignee: Scientific Innovations, Inc., Radnor ( * ) Notice: Subject to any disclaimer, the term of this patent is extended or adjusted under 35 U.S.C. 154(b) by 240 days.

(21) Appl. No.: 15/731,101

(22) Filed: Apr. 18, 2017

Related U.S. Application Data (60) Provisional application No. 62/391,083, filed on Apr. 19, 2016.

(51) Int. Cl.
*G01S 15/00* (2006.01)
*G01S 13/86* (2006.01)
(Continued)

(52) U.S. Cl.
CPC .......... *G01S 15/003* (2013.01); *G01S 13/862* (2013.01); *G01S 3/808* (2013.01); *G01S 11/16* (2013.01)

(58) Field of Classification Search
CPC ...... G01S 13/862; G01S 15/003; G01S 11/16; G01S 3/808; G01S 15/526
See application file for complete search history.

(56) References Cited

U.S. PATENT DOCUMENTS 5,031,159 A   7/1991   Rouquette
H001618 H  * 12/1996  Blume .......................... 367/125
(Continued)

FOREIGN PATENT DOCUMENTS

| EP | 2355451 B1 | 1/2013 |
|----|---|---|
| IN | 3649/CHE/2011 A | 6/2013 |
| JP | 07229959 A | 8/1995 |

OTHER PUBLICATIONS

Munro, et al.; A Feasibility—study of a Micro-Communications Sonobuoy Deployable by UAV Robots; World Academy of Science, Engineering and Technology International Journal of Mechanical, Aerospace, Industrial, Mechatronic and Manufacturing Engineering vol. 6, No. 10, 2012.

(Continued)

*Primary Examiner* — Ian J Lobo
(74) *Attorney, Agent, or Firm* — Louis J Hoffman; David S Alavi (57) ABSTRACT

Multistatic active coherent sonar systems and methods include reception by floating receiver sonobuoys of acoustic signals emitted by floating source sonobuoys, by both direct propagation from the source sonobuoys and reflection or scattering from a target object. Subsequent calculations based at least in part on those signals can be employed to estimate relative or absolute positions or velocities of the target object and the source and receiver sonobuoys. The estimated relative velocities and positions can be calculated without relying on GPS or other extrinsic positioning signals acquired for each sonobuoy after its deployment. Acoustic signals emitted by a stationary source on the seabed, received by a stationary receiver on the seabed, or reflected/scattered from a bathymetric feature, can be employed to estimate absolute or relative positions or velocities of the target object and the source and receiver sonobuoys.

28 Claims, 5 Drawing Sheets

(51) Int. Cl.
*G01S 3/808* (2006.01)
*G01S 11/16* (2006.01)

(56) References Cited

U.S. PATENT DOCUMENTS

| | | | |
|---|---|---|---|
| 5,995,445 | A | 11/1999 | Whitesell et al. |
| 6,697,300 | B1 | 2/2004 | Holt |
| 7,219,032 | B2 | 5/2007 | Spiesberger |
| 7,233,545 | B2 | 6/2007 | Harvey, Jr. et al. |
| 7,343,222 | B2 | 3/2008 | Solomon |
| 7,363,191 | B2 | 4/2008 | Spiesberger |
| 7,379,388 | B2 | 5/2008 | Protoolis et al. |
| 7,382,687 | B2 | 6/2008 | Doolan |
| 8,010,314 | B2 | 8/2011 | Spiesberger |
| 8,112,176 | B2 | 2/2012 | Solomon |
| 8,311,773 | B2 | 11/2012 | Spiesberger |
| 8,639,469 | B2 | 1/2014 | Spiesberger |
| 9,213,099 | B1 * | 12/2015 | Nielsen ................ G01S 15/003 |
| 9,217,791 | B1 * | 12/2015 | Wakayama ............. G01S 15/02 |
| 2009/0316522 | A1 * | 12/2009 | Sato ........................ B63G 8/39 367/5 |
| 2014/0376334 | A1 | 12/2014 | Fillinger et al. |
| 2017/0227638 | A1 * | 8/2017 | Nicoletti ................ G01S 15/89 |

OTHER PUBLICATIONS

Prasad et al.; Deployable Sonar Systems for Underwater Communications; Apr. 2009.

Holler, Roger; The Evolution of the Sonobuoy from World War II to the Cold War; U.S. Navy Journal of Underwater Acoustics; Nov. 5, 2013.

Van Walree et al.; UUV Convert Acoustic Communications; Proc. UAM, Nafplion, Greece, Jun. 2009.

Spiesberger et al.; Basin-Scale Tomography: Synoptic Measurements of a 4000-km Length Section in the Pacific; Journal of Physical Oceanography; vol. 19, No. 8; Aug. 1989.

Headrick et al.; Tidal signals in basin-scale acoustic transmissions; The Journal of the Acoustical Society of America 93 (2), 790-802; Feb. 1993.

Birdsall et al.; Signals, signal processing, and general results; The Journal of the Acoustical Society of America 1994 96 (4), 2343-2352; Oct. 1994.

* cited by examiner

SELF-LOCATING SYSTEM AND METHODS FOR MULTISTATIC ACTIVE COHERENT SONAR

BENEFIT CLAIMS TO RELATED APPLICATIONS

This application claims benefit of U.S. provisional App. No. 62/391,083 filed Apr. 19, 2016, in the name of John L. Spiesberger; said provisional application is incorporated by reference as if fully set forth herein.

FIELD OF THE INVENTION

The field of the present invention relates to multistatic active coherent sonar. In particular, systems and methods are disclosed for estimating locations and velocities of multiple source and receiver sonobuoys, one or more sea-floor acoustic sources or receivers, or one or more submerged target objects.

BACKGROUND

Active Sonar (SOund Navigation And Ranging) is a technique whereby acoustic signals are emitted by an acoustic source device to propagate underwater, reflect or scatter from various underwater objects or bathymetric features, and be detected by an acoustic receiver. Position and velocity of a submerged object can be estimated from intensity, timing, phase, Doppler shift, directionality, or other properties of the acoustic signals reflected or scattered from the object and then detected. Sources and receivers can be ship-borne, submarine-borne, borne by a floating buoy (referred to as a sonobuoy), or fixed to (or resting upon) the sea floor or other bathymetric feature (e.g., a seamount or guyot).

The simplest active sonar systems are monostatic and non-coherent, i.e., a single device is the source of a simple impulsive acoustic signal (such as an explosion) and also receives back-reflected or back-scattered echoes of that signal. Bistatic systems employ source and receiver at separate locations, while multistatic systems employ multiple sources and/or multiple receivers at multiple locations. A larger number of sources and/or receivers provides a correspondingly larger dataset with which to detect a submerged target object and from which to extract estimates of the position and velocity of the target object. Target position and velocity can be estimated from the received signals using any suitable computation technique, e.g., using one or more techniques such as Sequential Bound Estimation (SBE; disclosed in U.S. Pat. Nos. 7,219,032, 7,363,191, 8,010,314, 8,311,773, and 8,639,469, each issued in the name of inventor John Louis Spiesberger) and each incorporated by reference as if fully set forth herein).

More complex active sonar systems are so-called coherent systems, in which the acoustic signals emitted by the source(s) have more complex temporal or frequency characteristics (e.g., frequency chirp, multiple pulses, varying pulse intervals or durations, or other varied or optimized waveform). Estimates of a target's velocity can be made with traditional Doppler estimation techniques (e.g., using matched filters) or with more accurate techniques such as Coherent Time Change Estimation (CTCE; as disclosed in (i) Spiesberger et al, J. Physical Oceanogr., 19(8), 1073-1090, 1989; (ii) Headrick et al, J. Acoust. Soc. Am., 93, 790-802, 1993; and (iii) Birdsall et al, J. Acoust. Soc. Am. 96, 2343-2352, 1994, each of which is incorporated by reference as if fully set forth herein) for the bistatic or multistatic Doppler estimation technique disclosed in the second Appendix of the provisional application cited and incorporated above.

Sonar has been and still is used extensively by naval forces in submarine and anti-submarine warfare (ASW) for detecting, locating, and targeting submerged enemy submarines. The importance of rapidly obtaining accurate estimates of position and velocity of an enemy submarine during a battle or other tactical situation is obvious. A common approach is deployment of a set of multiple sonobuoys in an area where an enemy sub is suspected and operation of those sonobuoys as a multistatic active coherent (MAC) system to estimate the target sub's position and velocity. A central controller (typically mounted in an aircraft such as a Boeing P8A Poseidon deployed in the vicinity; often the same aircraft that dropped the sonobuoys) directs and monitors the emission of acoustic signals by the source sonobuoy(s) and receives from the receiver sonobuoy(s) electronic signals representative of the received acoustic signals (or filtered or otherwise processed versions thereof). Calculations (using any one or more suitable computation techniques, e.g., CTCE or SBE) based at least in part on those received waveforms (using as inputs position and velocity information for each of the source and receiver sonobuoys, and in some cases also using source timing and waveform information) yields an estimate of the position and velocity of the submerged target sub. SBE has been employed previously for naval target estimation. CTCE, disclosed in the provisional application cited and incorporated above, has not been known to be employed to detect or locate target objects of interest to the Navy.

Detection of a target object, and accuracy of any estimated target position and velocity derived from signals emitted and received in a MAC system, depend on the accuracy within which the positions and velocities of the multiple source and receiver sonobuoys is known. Once deployed and floating at the sea surface, the sonobuoys drift, each one independent of the others. The sonobuoys can be equipped with Global Positioning System (GPS) or similar equipment so as to enable each to determine its position and velocity, and then the sonobuoys can transmit that information to the central controller for use in subsequent processing. It would be desirable to develop systems and methods that enable earlier detection of target objects and accurate target position and velocity estimates using multiple-sonobuoys of a MAC sonar system even in the absence of GPS signals or other extrinsic positioning signals acquired for a sonobuoy after its initial deployment. Initial estimates of sonobuoy positions are typically made using navigation systems on the deploying aircraft and models of the sonobuoys' trajectories in the air after release until hitting the water. However, once the sonobuoys start to drift, uncertainty of their respective positions grows with time in the absence of GPS or other extrinsic positioning signals. Position uncertainty of drifting sonobuoys has been, and continues to be, a fundamental limitation on the goal of reliably detecting and accurately locating target objects using a MAC system. The United States Navy has solicited proposals for such systems and methods for decades and continues to desire further improvements.

SUMMARY

Some inventive MAC sonar systems and methods include a set of multiple source sonobuoys floating in or on a body of water, a set of multiple received sonobuoys floating in or on a body of water, two or more stationary acoustic devices in the body of water, and a control unit having one or more programmed electronic processors. The two or more stationary acoustic devices include (i) two or more stationary acoustic sources or (ii) two or more stationary acoustic receivers. The control unit receives, from one or more of the multiple receiver sonobuoys, a set of receiver electromagnetic signals that includes one or more portions that are representative of or derived from (i) two or more acoustic signals emitted or received by at least two of the two or more stationary acoustic devices and (ii) two or more acoustic signals received by one or more of the multiple receiver sonobuoys via direct propagation within the body of water. Using one or more of the electronic processors, the control unit calculates, based at least in part on the representative or derived signal portions of the receiver electromagnetic signals, an estimated absolute or relative velocity or an estimated absolute or relative position for at least one of the multiple receiver sonobuoys.

Some inventive MAC sonar systems and methods include a set of multiple source sonobuoys floating in or on a body of water, a set of multiple receiver sonobuoys floating in or on a body of water, and a control unit having one or more programmed electronic processors. The control unit receives, from one or more of the multiple receiver sonobuoys, a set of receiver electromagnetic signals that includes one or more portions that are representative of or derived from two or more acoustic signals. Those acoustic signals are emitted by one or more of the multiple source sonobuoys and received by one or more of the multiple receiver sonobuoys via corresponding acoustic pathways through the body of water. The acoustic pathways include four or more distinct acoustic pathways through the body of water, and at least three of the distinct acoustic pathways include reflection or scattering from one or more natural or artificial bathymetric features in the body of water. Using one or more of the electronic processors, the control unit calculates, based at least in part on the representative or derived signal portions of the receiver electromagnetic signals, an estimated absolute or relative velocity or an estimated absolute or relative position for at least one of the multiple receiver sonobuoys.

In some of the inventive MAC sonar systems and methods, estimated absolute or relative velocity or position of one or more receiver sonobuoys can be calculated without relying on GPS or other extrinsic positioning signals acquired for each sonobuoy after that sonobuoy is deployed. In some of the inventive MAC sonar systems and methods, the control unit also calculates, based at least in part on the representative or derived signal portions of the receiver electromagnetic signals, an estimated absolute or relative velocity or position of at least one of the multiple source sonobuoys. In some of the inventive MAC sonar systems and methods, estimated absolute or relative velocity or position of one or more source sonobuoys can be calculated without relying on GPS or other extrinsic positioning signals acquired for each sonobuoy after that sonobuoy is deployed. In some of the inventive MAC sonar systems and methods, estimated initial deployed positions of one or more of the sonobuoys can be incorporated into the calculation of the estimated absolute or relative velocity or position.

In some of the inventive MAC sonar systems and methods, the set of receiver electromagnetic signals includes one or more signal portions representative of or derived from one or more corresponding acoustic signals emitted by one or more of the multiple source sonobuoys and received by one or more of the multiple receiver sonobuoys via reflection or scattering from a target object in or on the body of water. Using the one or more electronic processors, the control unit calculates, based at least in part on the representative or derived signal portions of the set of receiver electromagnetic signals received by the control unit, an estimated absolute or relative position or an estimated absolute or relative velocity of the target object.

In some of the inventive MAC sonar systems and methods, estimated positions or velocities can be calculated, based on received acoustic signals, using one or more of time delays, time differences of arrival, Doppler shifts, matched filters, CTCE, SBE, Bayesian methods, or other suitable measurement(s) or computational technique(s) to process the received acoustic signals, in some instances without relying on GPS or other extrinsic positioning signals acquired for each sonobuoy after its deployment in the body of water. In addition, other computational methods can also be employed, including those that do not necessarily rely on a received acoustic signal, e.g., using a stepwise approximation process or a numerical integration process.

Objects and advantages pertaining to MAC sonar systems and methods may become apparent upon referring to the example embodiments illustrated in the drawings or disclosed in the following written description or appended claims and shall fall within the scope of the present disclosure.

This Summary is provided to introduce a selection of concepts in a simplified form that are further described below in the Detailed Description. This Summary is not intended to identify key features or essential features of any subsequently claimed subject matter, nor is it intended to be used as an aid in determining the scope of such subsequently claimed subject matter.

The embodiments depicted are shown only schematically, and not all features may be shown in full detail or in proper proportion. Certain features or structures may be exaggerated relative to others for clarity. The embodiments shown are examples only and should not be construed as limiting the scope of the present disclosure or appended claims.

DETAILED DESCRIPTION OF EMBODIMENTS

As shown in FIGS. 1 through 5, a set of multiple source sonobuoys 101 and multiple receiver sonobuoys 102 are deployed in an area of interest of a body of water 30 (e.g., a sea or ocean) and float at the surface 31 of the body of water 30. Individual source sonobuoys are specifically labelled 101*a*, 101*b*, and so on; an individual source sonobuoy can be referred to generically as a source sonobuoy 101*x*, and the entire set can be referred to collectively as the source sonobuoys 101. Specific acoustic signals emanating from the source sonobuoys 101*a*, 101*b*, and so on are labelled as the corresponding source acoustic signals 201*a*, 201*b*, and so on; an individual source acoustic signal can be referred to generically as a source acoustic signal 201*x*, and the entire set of source acoustic signals can be referred to collectively as the source acoustic signals 201. A similar specific/generic/collective numbering scheme is employed for sonobuoys or acoustical sources 102, 103, 104 and signals 201, 203, 219, 299, 304, discussed below.

"Direct propagation" of an acoustic signal 201*x* emitted by a source sonobuoy 101*x* refers to propagation within the body of water 30 without substantial reflection or scattering from any surface or object capable of reflecting or scattering sound waves (e.g., the seabed, a bathymetric feature, fish or other marine organisms, bubbles or other gaseous cavity, or a target object). Such direct propagation often follows multiple paths due to refraction within the body of water (e.g., due to variations in propagation speed) or reflection from the surface 31, which is sometimes therefore referred to as multipath propagation or, in the appendices, as a section. The directional arrows in the drawings indicating propagation of acoustic signals 201 (and 219 and 299) are not intended to indicate acoustic beams or preferential directions of propagation, but instead to indicate direct propagation of corresponding portions of the emitted acoustic signals to specific corresponding destinations (e.g., direct propagation of a portion of the source acoustic signal 201*x* from a source sonobuoy 101*x* to a receiver sonobuoy 102*x*). In contrast, "indirect propagation" of an acoustic signal refers to propagation within the body of water 30 that includes reflection or scattering from a surface or object, such as the examples listed above.

Figure 5A:
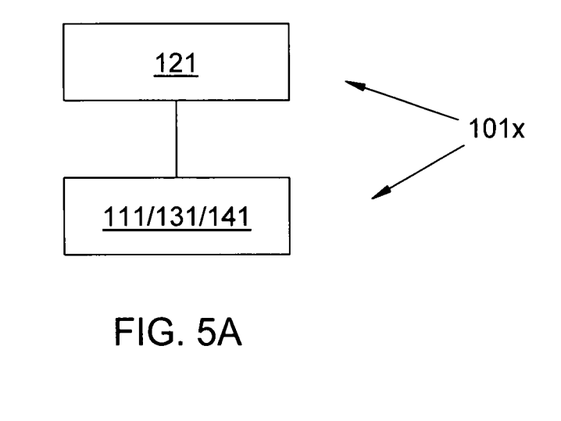
FIGS. 5A and 5B are schematic block diagrams of a source sonobuoy and a receiver sonobuoy, respectively.
Figure 5B:
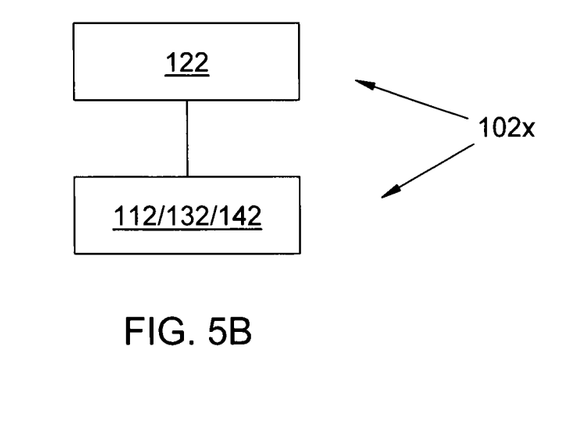
Figure 6:
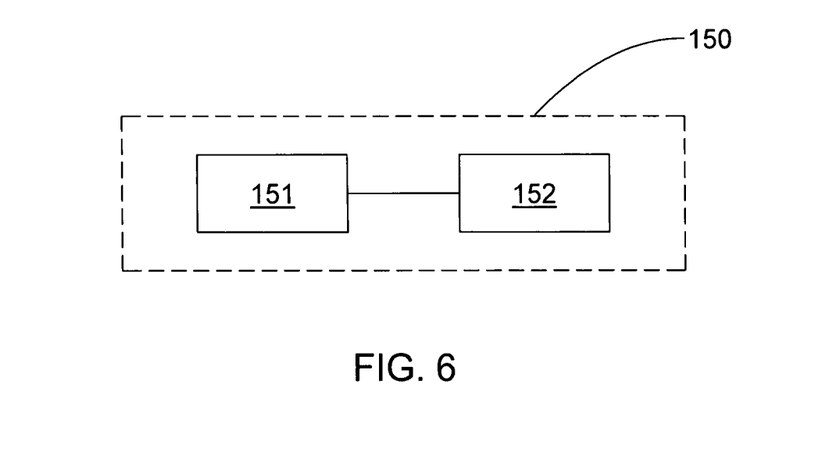
FIG. 6 is a schematic block diagram of a control unit.

Sonobuoys 101/102 can be of any suitable type or arrangement. Each includes a float or buoyant member 121/122, e.g., a hollow cavity or a low-density solid volume, and can be arranged to float entirely on the surface 31 or with an acoustic emitter portion 111 or acoustic receiver portion 112 that is suspended at some distance below the float portion 121/122 (as in FIGS. 6A and 6B). In the examples shown, each sonobuoy is either an acoustic source or an acoustic receiver; in some other examples, one or more of the sonobuoys can serve as both acoustic source and receiver. Each sonobuoy also can include an electromagnetic transmitter or receiver 131/132 connected to the corresponding acoustic source 111 or acoustic receiver 112 by corresponding electronic circuitry 141/142 (which can in some examples include one or more electronic processors). Such electromagnetic transmitters or receivers 131/132 can enable transmission of signals between sonobuoys 101/102 and a control unit 150.

Each source sonobuoy 101*x* includes at least a float portion 121 and an acoustic emitter 111 (including any necessary power source or drive electronics) and may also include suitable control electronics 141 or a radio frequency (RF) or other electromagnetic receiver or transmitter 131. An electromagnetic receiver (if present) enables a source sonobuoy 101*x* to receive an electromagnetic control signal transmitted by a control unit 150 (e.g., a command to emit a "ping" or other acoustic waveform, or a control signal for specifying a particular acoustic frequency or waveform); an RF transmitter (if present) enables source sonobuoy 101*x* to transmit to control unit 150 a signal, e.g., confirming that an acoustic emission has occurred, or indicating the timing, frequency, or waveform of such an emission. Control electronics 141 can include a clock or time base or can include components for receiving and processing a time base signal from control unit 150.

Each receiver sonobuoy 102*x* includes at least a float portion 122, an acoustic receiver 112 (e.g., a hydrophone; including any necessary power source or drive electronics), and a radio frequency (RF) or other electromagnetic transmitter 132, and may also include suitable control or processing electronics 142 or an RF or other electromagnetic receiver 132. Control electronics 142 can include a clock or time base or can include components for receiving and processing a time base signal from control unit 150.

Figure 1:
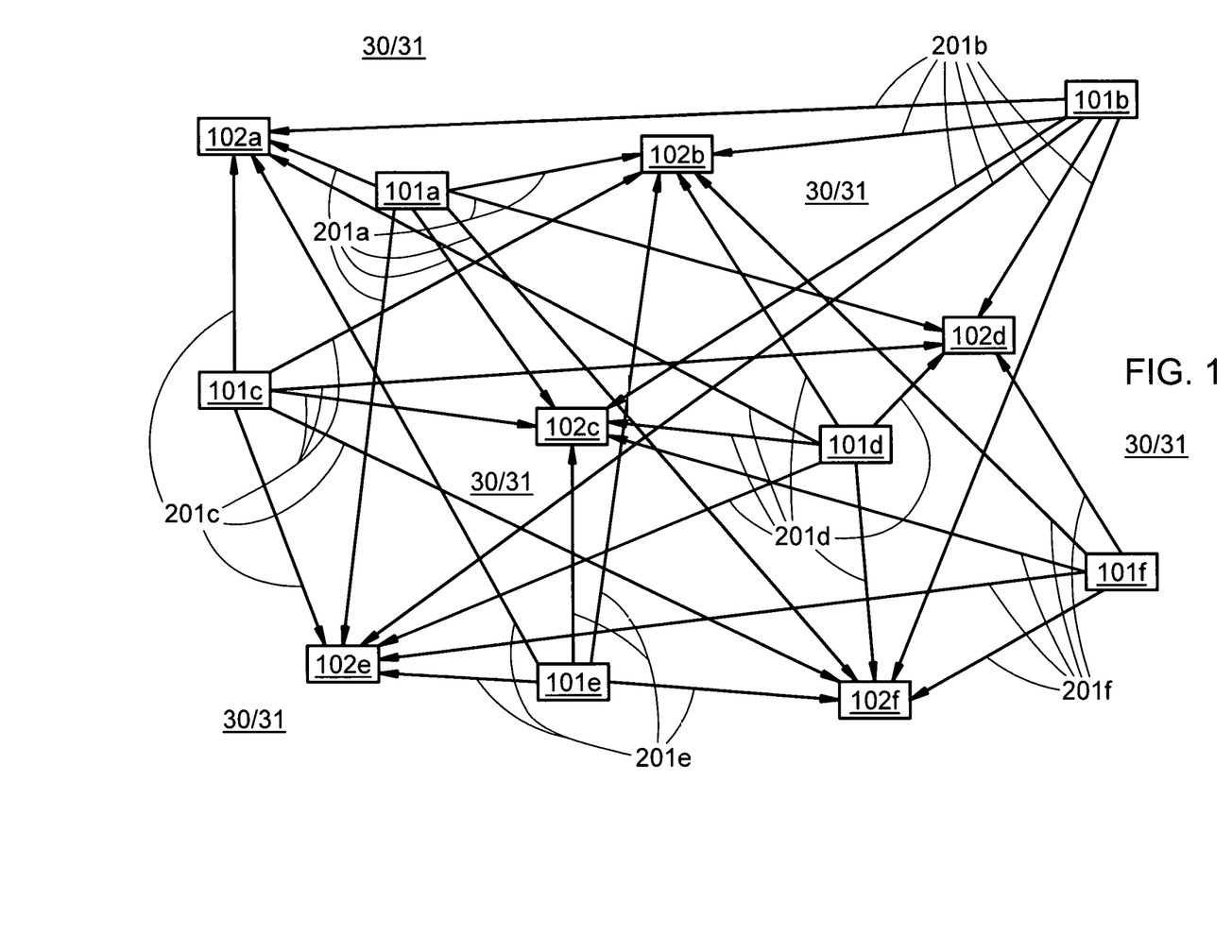
FIG. 1 is a top view of a top surface of a body of water such as an ocean or sea with multiple source and receiver sonobuoys floating thereon.
Figure 2:
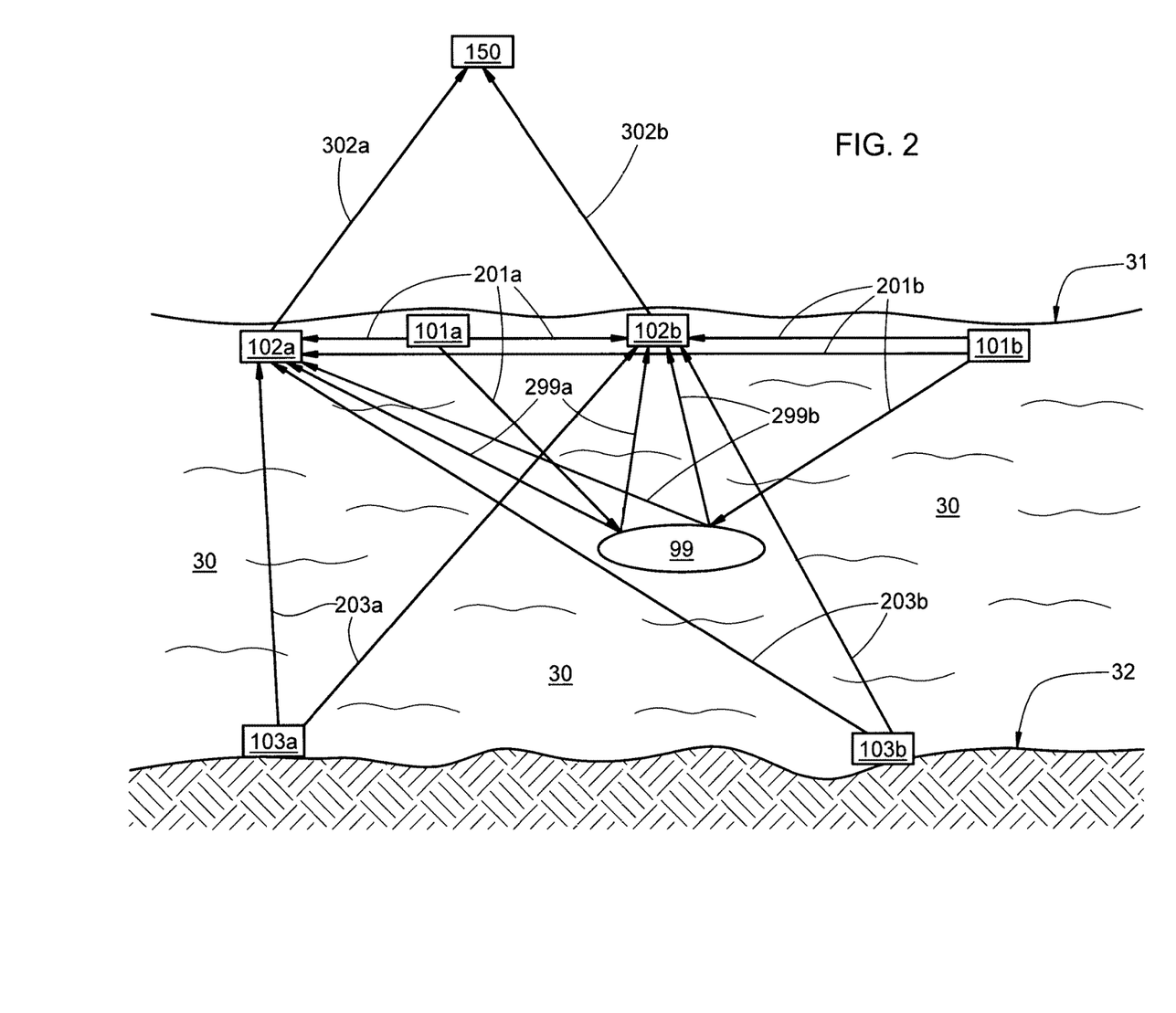
FIG. 2 is a side cross-sectional view of a body of water with multiple source and receiver sonobuoys floating at the top surface of the body of water, with two stationary acoustic sources on a bottom surface of the body of water, and with a target object in the body of water.
Figure 3:
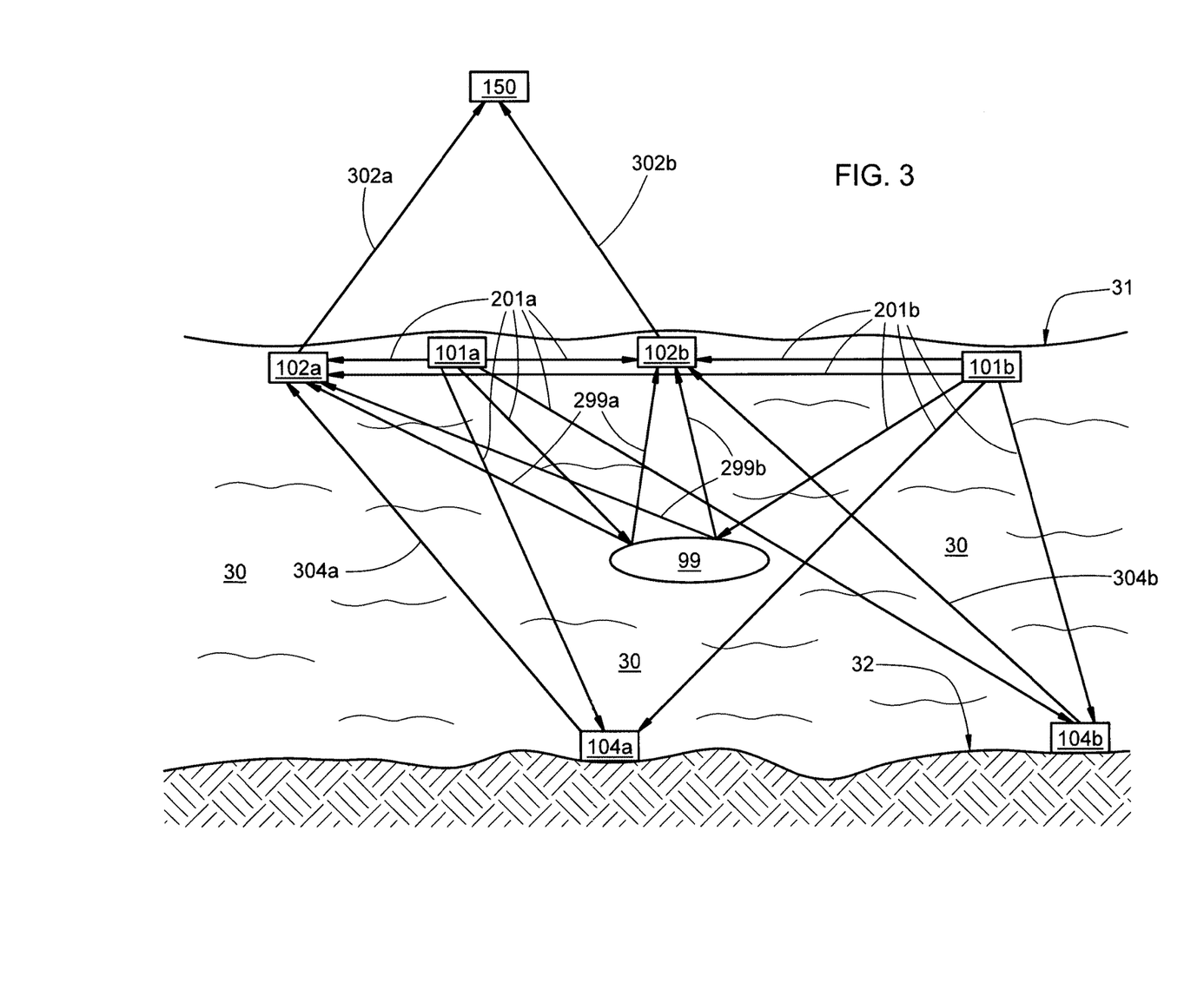
FIG. 3 is a side cross-sectional view of a body of water with multiple source and receiver sonobuoys floating at the top surface of the body of water, with two stationary acoustic receivers on a bottom surface of the body of water, and with a target object in the body of water.
Figure 4:
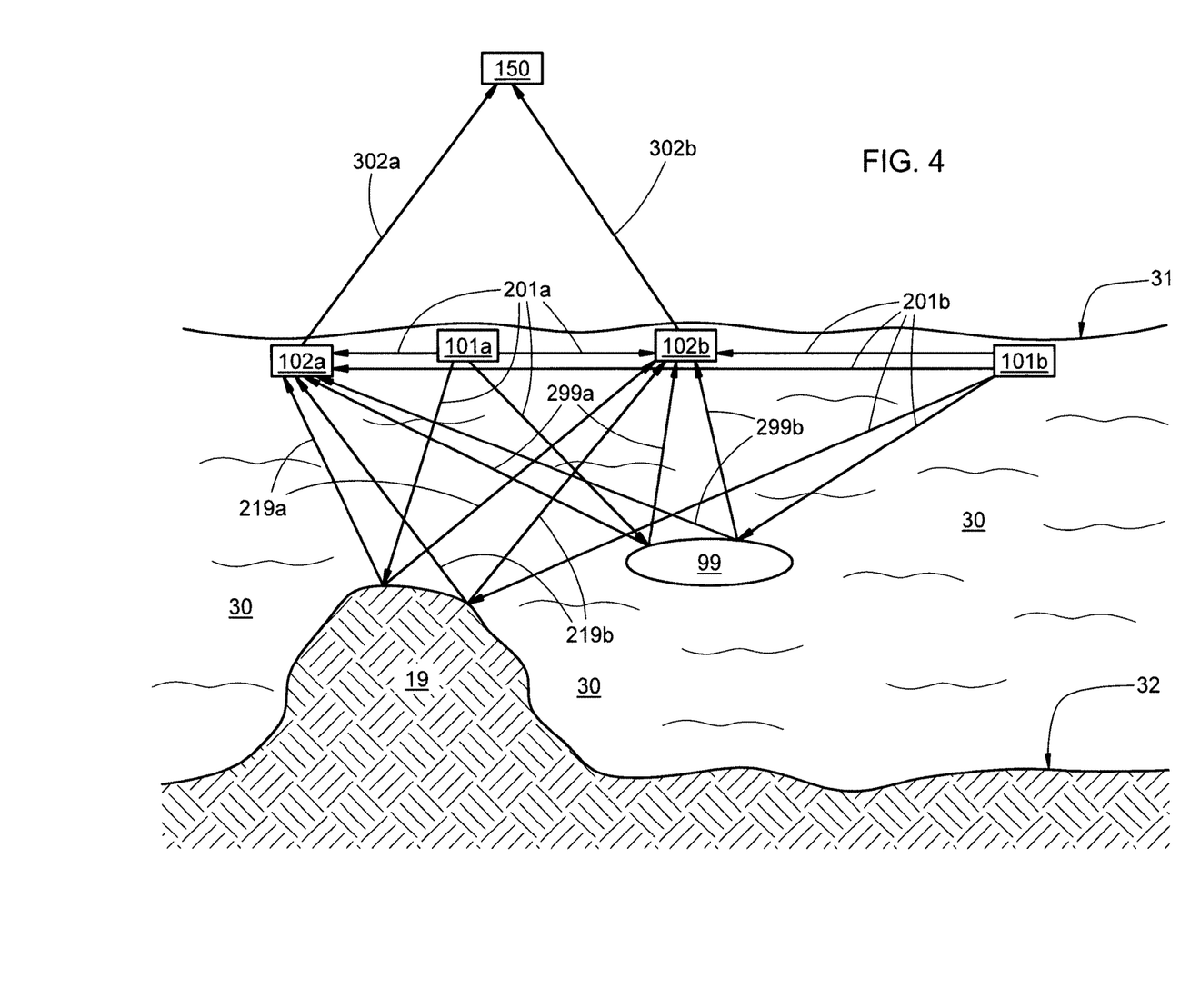
FIG. 4 is a side cross-sectional view of a body of water with a bathymetric feature, with multiple source and receiver sonobuoys floating at the top surface of the body of water, and with a target object in the body of water.

A superposition of acoustic signals 201, 219, or 299 that are received by receiver sonobuoy 102*x* is converted to an electromagnetic signal, and that electromagnetic signal is included as a portion of electromagnetic signal 302*x* which is transmitted to control unit 150 using electromagnetic transmitter 132 (transmitted directly in examples such as in FIGS. 2-4 or transmitted indirectly via one or more airborne, waterborne, or spaceborne relay units, crewed or crewless). In some examples, the signal portions included in the transmitted electromagnetic signal 302*x* can be representative of the corresponding received acoustic signals, e.g., by direct amplitude, frequency, or phase modulation of an RF carrier by the acoustic signals. In some examples, the signal portions included in the transmitted electromagnetic signal 302*x* can be derived from the corresponding received acoustic signals, e.g., by filtering, modulating, beamforming, digitizing, or other analog or digital signal processing performed at receiver sonobuoy 102*x*. An RF receiver 132 (if present) enables receiver sonobuoy 102*x* to receive an electromagnetic control signal transmitted by control unit 150 (e.g., a command to alter sample frequency, bandwidth, hydrophone sensitivity, or amplifier gain, or a control signal for specifying a particular filter). In some examples electromagnetic signal 302*x* can also include information in addition to the signal portions arising from the received acoustic signals, e.g., receiver sonobuoy status information indicating such things as amplifier gain or onboard signal processing being performed.

Sonobuoys 101/102 typically are deployed by being dropped from an aircraft (e.g., a Boeing P8A Poseidon; any suitable aircraft, crewed or crewless, can be employed). That aircraft also typically (but not necessarily) houses control unit 150 and remains in the area to control sonobuoys 101/102 and to receive and process the signals from sonobuoys 101/102 (including electromagnetic signals 302 from receiver sonobuoys 102). Control unit 150 includes an electromagnetic transmitter and receiver 151 and one or more electronic processors 152 (e.g., computer processors) that are structured, connected, and programmed, inter alia, to detect a target object 99 (e.g., a submarine, crewed or crewless) in the body of water 30 and to calculate estimated positions or velocities of sonobuoys 101/102 and a target object 99 in the body of water 30. Control unit 150 is described further below. Source sonobuoys 101 emit corresponding source acoustic signals 201 (automatically or, more typically, in response to an electromagnetic control signal received from control unit 150), and portions 299 of source acoustic signals 201 are reflected or scattered from the submerged target object 99. Portions of reflected or scattered acoustic signals 299 are received by one or more of receiver sonobuoys 102, and electromagnetic signals 302, which include signal portions representative of or derived from received signals 299, are transmitted to controller 150 (typically, but not necessarily, on the same aircraft that deployed sonobuoys 101/102). Based at least in part on the portions of the electromagnetic signals 302 arising from acoustic signals 299, control unit 150 detects the target object 99 and calculates its estimated position or velocity. Estimated positions can be computed in an absolute reference frame (i.e., a reference frame that is stationary with respect to the seabed; e.g., geographic coordinates such as latitude and longitude) or in a relative reference frame (e.g., relative to estimated positions of one or more of sonobuoys 101/102, which typically drift). For purposes of the present disclosure or appended claims, if a position or velocity is not specifically designated as absolute or relative in a particular context, it can be either in that context.

However, detection of target object 99 and accuracy of its estimated position and velocity are limited by the accuracy of estimated positions and velocities of source and receiver sonobuoys 101/102. For example, improved estimates of the positions of drifting sonobuoys yield improved estimates for absolute position and velocity of a target object that reflects or scatters acoustic signals, because the source/target/receiver geometry is more accurately known. In addition, accurately estimating absolute velocities of source and receiver sonobuoys also enables more accurate estimation of their absolute positions with time as they drift after deployment. The sonobuoys' initial positions upon deployment typically can be estimated, e.g., by calculating their trajectories after being released from an aircraft at a known absolute position and velocity until reaching surface 31 of the body of water 30. Those initial sonobuoy positions, along with time series of estimated sonobuoy velocities, can be employed to calculate corresponding time series of estimated sonobuoy positions, e.g., using a stepwise approximation process (essentially integrating the time-dependent estimated velocity to yield time-dependent estimated changes in position).

Acoustic signals 201 emitted by sonobuoys 101 can be reflected or scattered from a variety of surfaces or objects in the body of water, including target object 99 and the other examples listed above. One limitation on detecting a target object 99 is distinguishing acoustic signals reflected from or scattered by target object 99 from other reflected or scattered acoustic signals (multiple signals). One technique for distinguishing such signals is to estimate velocities and accelerations associated with reflecting/scattering objects in the water. For example, marine life would not be expected to be moving above certain speeds, while a submarine typically would not be expected to be moving below a certain minimum speed. Regardless, accuracy of such estimates can be improved by more accurate estimates of absolute velocities of source and receiver sonobuoys 101/102.

As noted above, each of the source and receiver sonobuoys 101/102 drifts with a velocity that is independent of the others. In some instances sonobuoys 101/102 include GPS receivers that provide position and velocity information that is uploaded to control unit 150, used for target object detection, and incorporated into the calculation of the estimated position and velocity of target object 99. However, it is desirable to estimate accurately sonobuoy positions and velocities after deployment without relying on GPS or other extrinsic positioning signals acquired for each sonobuoy after its initial deployment. The United States Navy has sought such a system for decades; the inventive systems and methods disclosed herein would significantly benefit the Navy's MAC ASW system. Inventive systems and methods disclosed or claimed herein employ source and receiver sonobuoys in a non-conventional manner to reduce errors or uncertainties in estimating positions or velocities of those drifting sonobuoys. The inventive systems and methods include particular configurations of source and receiver sonobuoys (and in some instances stationary acoustic devices), and particular methods of using the raw data from the receiver sonobuoys (and in some instances stationary acoustic receivers) in order to more accurately calculate estimated positions or velocities of drifting source and receiver sonobuoys. Those improved estimated positions or velocities in turn enable improved estimation of position or velocity of a target object.

For purposes of the present disclosure and appended claims, each "estimated" position, velocity, or other variable can be defined as a single point-like value of the variable or as an error bar or confidence interval for that variable. For example, an estimate for the absolute position of a sonobuoy can be a latitude and longitude and can optionally include an error bar or confidence limit for its latitude and longitude.

In some examples of disclosed inventive MAC sonar systems and methods (e.g., as in FIG. 2), two or more stationary acoustic sources 103 can be located at a bottom surface 32 of the body of water 30 (e.g., each resting on, or tethered or anchored to, the seabed or other bathymetric feature, so that its position is constrained within a negligibly small range and its speed is negligibly small relative to speeds of the drifting sonobuoys 101/102). If flexible tethers are used, they can be buttressed or counterbalanced so that stationary acoustic sources 103 move laterally, such as in response to currents, only negligibly. Each stationary acoustic source 103x includes an acoustic emitter and any necessary power source, drive electronics, or control electronics; the control electronics can include a clock or time base or can include components for receiving and processing a signal from control unit 150 or transmitting a signal to control unit 150 while still near the surface 31. The stationary acoustic sources 103 often can be deployed from the same aircraft that deployed sonobuoys 101/102; instead of floating like sonobuoys 101/102, acoustic sources 103 sink to the bottom surface 32 of the body of water 30. Each stationary acoustic source 103x emits corresponding acoustic signal 203x that is received by one or more of the drifting receiver sonobuoys 102 (by direct propagation within the body of water 30). Signal portions arising from received acoustic signals 203 can be included in electromagnetic signals 302 that are transmitted to control unit 150.

Once at the bottom of the body of water 30, each stationary source 103x has a known absolute velocity of zero, so that calculations, based at least in part on those portions of electromagnetic signals 302 arising from acoustic signal 203, can be employed to estimate (i) absolute positions or velocities of receiver sonobuoys 102, and (ii) absolute position of stationary source 103, without relying on GPS or other extrinsic positioning signals acquired for each sonobuoy after its initial deployment.

The calculating can begin even while stationary source 103x is still sinking to the seabed, if it emits acoustic signal 203x during its descent and if that signal 203x is received by one or more of the floating receiver sonobuoys 102. Instead or in addition, source 103x can include a pressure gauge for estimating its depth, and the pressure reading can be encoded on the corresponding acoustic signal 203x while it sinks or after its descent.

The absolute positions of stationary sources 103 (once they come to rest at the bottom surface 32 of the body of water 30) can in some examples be estimated based on estimated absolute positions of their entry into the body of water and their estimated velocities (as a function of time) as they sink, e.g., by a stepwise approximation method or numerical integration of the estimated velocities as sources 103 sink.

The quantities estimated for stationary sources 103 and receiver sonobuoys 102 can be employed to estimate absolute or relative positions or velocities of the source sonobuoys 101 without relying on GPS or other extrinsic positioning signals acquired for each sonobuoy after its initial deployment. Any suitable calculation can be employed, including those described above, in the appendices, or in the provisional application cited and incorporated above.

Analogous to the preceding examples, in some examples (e.g., as in FIG. 3) two or more stationary acoustic receivers 104 can be located at the bottom surface 32 of the body of water 30 (e.g., each resting on, or tethered or anchored to, the seabed or other bathymetric feature, so that its position is constrained within a negligibly small range and its velocity is negligibly small relative to velocities of the drifting sonobuoys 101/102). Each stationary acoustic receiver 104$x$ includes an acoustic receiver and any necessary power source, drive electronics, control electronics, or processing electronics; the electronics can include a clock or time base or can include components for receiving and processing a signal from control unit 150 or transmitting a signal to control unit 150 while still near the surface 31. The stationary acoustic receivers 104 can be deployed as discussed above for stationary sources 103. Each stationary acoustic receiver 104$x$ receives portions of one or more of the signals 201 by direct propagation from one or more of the drifting acoustic sources 101 within the body of water 30. A superposition of the acoustic signals 201, 219, or 299 that is received by each stationary acoustic receiver 104$x$ is converted to or incorporated into a signal 304$x$ that is transmitted to at least one of the receiver sonobuoys 102$x$ (in the example shown, signal 304$a$ received by receiver sonobuoy 102$a$, and signal 304$b$ received by receiver sonobuoy 102$b$; in other examples, a single receiver sonobuoy can receive all signals 304). Each receiver sonobuoy 102$x$ that receives a corresponding signal 304$x$ can be adapted so as to include in the corresponding electromagnetic signal 302$x$ a signal portion that is representative of, or derived from, the signal 304$x$, so that information in signal 304$x$ can be relayed to control unit 150. Each signal 304$x$ is an acoustic signal, because an electromagnetic signal typically would not propagate far enough through the body of water 30 to reach the receiver sonobuoy 102$x$ or the control unit 150 reliably.

In some examples, the signal portions included in the transmitted signals 304 can be derived from the corresponding received acoustic signals, e.g., by filtering, modulating, digitizing, or other analog or digital signal processing performed at the stationary acoustic receivers 104. For example, receiver 104$x$ can estimate Doppler shift or, equivalently, the change in signal propagation time with the CTCE method and then transmit only that derived information at signal 304, instead of transmitting the entire received acoustic signal. In some examples signal 304 can include an estimate of incoming signal direction(s). In some examples, stationary acoustic receivers 104 can estimate the times of arrival of signals from drifting source sonobuoys 102 and transmit those arrival times to one or more of the receiver sonobuoys 102 for relay to control unit 150 by inclusion in one or more of the receiver electromagnetic signals 302.

Signal portions arising from acoustic signals 201 (and in some examples also signals 299 or 219) received by stationary acoustic receivers 104 can be included in at least one of the electromagnetic signals 302 that are transmitted to control unit 150. After reaching the bottom of the body of water 30, each stationary receiver 104$x$ has a known absolute velocity of zero, so that calculations, based at least in part on those portions of electromagnetic signals 302 arising from signals 304, can be performed to estimate (i) absolute positions or velocities of receiver sonobuoys 102, and (ii) absolute position of stationary receivers 104. Again, position estimation can be done without relying on GPS or other extrinsic positioning signals acquired for each sonobuoy after its initial deployment, and any suitable calculation method can be employed, including those mentioned above for stationary sources 103.

In some examples of disclosed inventive MAC sonar systems and methods, various combinations of the above examples can be employed in which one or more stationary acoustic receivers 104 can be deployed and employed along with two or more stationary acoustic sources 103, or in which one or more stationary acoustic sources 103 can be deployed and employed along with two or more stationary acoustic receivers 104.

In some examples of disclosed inventive MAC sonar systems and methods (e.g., as in FIG. 4), portions of acoustic signals 201 emitted by source sonobuoys 101 are reflected or scattered from a bathymetric feature 19 to generate corresponding acoustic signals 219. Acoustic signals 219 can be received by one or more of receiver sonobuoys 101. The receiver electromagnetic signals 302 include portions representative of, or derived from, acoustic signals 219 received by one or more receiver sonobuoys 102 via at least four distinct acoustic pathways through the body of water 30; at least three of those distinct acoustic pathways include reflection or scattering from one or more natural or artificial bathymetric features 19 in the body of water 30. In the example illustrated in FIG. 4, four distinct pathways are (i) a portion of acoustic signal 201$a$ emitted by source sonobuoy 101$a$ reflected by bathymetric feature 19 to propagate as acoustic signal 219$a$ to receiver sonobuoy 102$a$, (ii) a portion of acoustic signal 201$a$ emitted by source sonobuoy 101$a$ reflected by bathymetric feature 19 to propagate as acoustic signal 219$a$ to receiver sonobuoy 102$b$, (iii) a portion of acoustic signal 201$b$ emitted by source sonobuoy 101$b$ reflected by bathymetric feature 19 to propagate as acoustic signal 219$b$ to receiver sonobuoy 102$a$, and (iv) a portion of acoustic signal 201$b$ emitted by source sonobuoy 101$b$ reflected by bathymetric feature 19 to propagate as acoustic signal 219$b$ to receiver sonobuoy 102$b$.

Bathymetric feature 19 can be a natural bathymetric feature (e.g., a seamount, guyot, undersea canyon, coral reef, or other topographic feature of the seabed), an artificial bathymetric feature (e.g., an acoustic reflector installed on the seabed, a sunken wreck, undersea drilling equipment, or an artificial reef), or a combination of an artificial feature located on or in a natural feature. Bathymetric feature 19 can be characterized by a single location of or on the feature (e.g., the peak of a seamount or artificial reef, or the location of an acoustic reflector) or by a complete or partial one- or two-dimensional elevation profile. Calculations based at least in part on acoustic signals 219 (e.g., by Doppler measurement, CTCE, SBE, or other suitable technique, and by employing some or all location or profile data available for bathymetric feature 19) enables estimation of absolute or relative positions or velocities of source or receiver sonobuoys 101/102 without relying on GPS or other extrinsic positioning signals acquired for each sonobuoy after its initial deployment, if the absolute position of the bathymetric feature is estimated, because the absolute velocity of the bathymetric feature is known (i.e., negligible or zero). In some examples, a digital database can be employed to store and make available location or profile data for bathymetric features; such a database can be included in control unit 150 or otherwise made accessible to control unit 150. Any suitable calculation can be employed, including those described above or in the provisional application cited and incorporated above.

In addition to receiving acoustic signals 299 reflected or scattered from the target object 99, acoustic signals 203, or signals 304, each receiver sonobuoy 102x also can receive one or more acoustic signals 201 by direct propagation within the body of water 30 from corresponding source sonobuoys 101. In the inventive MAC sonar systems and methods disclosed or claimed herein, those additional signal portions can be incorporated into calculations that enable estimation of absolute or relative positions or velocities of the source and receiver sonobuoys 101/102, without necessarily relying on GPS or other extrinsic positioning signals acquired for each sonobuoy after its initial deployment. In other words, the sonobuoys 101/102 themselves can be employed to assist in "self-locating" using the disclosed inventive systems and methods. Any suitable processing technique can be employed for the estimation, including any of those mentioned herein.

Regardless of which one or more of the above examples are employed to estimate absolute or relative positions or velocities for the source and receiver sonobuoys 101/102, those estimates are incorporated into the calculation used to estimate absolute or relative position and velocity of the target object 99. Absolute positions and velocities typically are defined with respect to the earth's surface, e.g., latitude and longitude. Also regardless of example, any suitable method for calculating positions and velocities of the sonobuoys 101/102 and the target object 99 can be employed; e.g., Doppler measurement, CTCE, SBE, Bayesian estimation techniques, or those described in the appendices of this application or incorporated in the provisional application. Other computation methods also can be employed, including those that do not rely solely on one or more received acoustic signals. In some examples, SBE can be employed for these purposes. SBE can be particularly advantageous for estimating the location of seafloor-located stationary sources or receivers because it yields correct and typically small bounds for location even when initial estimates of its location and locations of drifting sonobuoys 101/102 are inaccurate. Such is not the case for linearized location methods, such as a linearized Kalman filter, whose confidence limits for location are inaccurate or incorrect when the initial guess for locations are inaccurate.

In any of the disclosed inventive MAC sonar systems and methods described herein, as in conventional systems and methods, acoustic signals 201 emitted by the source sonobuoys 101 (or stationary sources 103) can be reflected or scattered from a target object 99 in or on the body of water 30. Those reflected or scattered signals 299 are received by one or more of the receiver sonobuoys 102 (or stationary receivers 104) and used to calculate estimated position and velocity of the target object 99. However, in the disclosed inventive systems and methods, positions and velocities are estimated for source and receiver sonobuoys 101/102 according to one or more of the examples described above, without necessarily relying on GPS or other extrinsic positioning signals acquired for each sonobuoy after its initial deployment. The sonobuoy positions and velocities thus estimated (referred to as a "stabilized buoy field") are used in the signal processing (e.g., by Doppler measurement, bistatic or multistatic Doppler estimation (see second Appendix of the provisional application cited and incorporated above), CTCE, SBE, or one or more other suitable techniques) that yields the estimated position and velocity of the target object 99 in a desired relative or absolute frame of reference.

In examples wherein stationary sources or receivers 103/104 include a clock or a time base, the time bases for each source or receiver can drift relative to one another and relative to a time base of control unit 150. In examples wherein those time bases are employed in calculations, time base drift can degrade the accuracy of position and velocity estimates calculated based on the received acoustic signals. In some examples, the time bases can be included as additional quantities (in addition to relative or absolute positions or velocities of the target object 99, source or receiver sonobuoys 101/102, or stationary sources/receivers 103/104) to be estimated by calculations performed by control unit 150. Those calculations can be performed using any suitable calculation method, including those examples disclosed herein.

In any of the disclosed inventive MAC sonar systems and methods described herein, control unit 150 is employed to calculate estimated absolute or relative positions or velocities of one or more source sonobuoys 101, receiver sonobuoys 102, target object 99, stationary sources 103, stationary receivers 104, or bathymetric features 19, or time base drift or errors in any of those devices. Those calculations are based at least in part on portions of the receiver electromagnetic signals 302 that are representative of, or derived from, one or more of acoustic signals 201, 203, 219, or 299 received by one or more receiver sonobuoys 102 or stationary receivers 104. In some examples, those calculations also can be based at least in part on other data, inputs, or quantities that do not arise from received acoustic signals. For example, pressure gauges can provide depth information for stationary source and receivers 103/104 as they sink and after they reach the bottom. In some examples, initial positions of the sonobuoys 101/102 or stationary devices 103/104 can be estimated based on a position and velocity of a deploying aircraft at the time the sonobuoys are dropped, and calculation of their trajectories until hitting the surface 31 of the body of water 30. Those initial estimated positions can in some instances rely upon GPS or other extrinsic positioning signal, even though subsequent calculations of estimated velocities or positions do not rely upon GPS or other extrinsic positioning signals acquired for each sonobuoy after its initial deployment. Subsequent estimated positions can be calculated based on the initial estimated positions and subsequent estimated velocities, e.g., using a stepwise approximation process or numeric integration of estimated velocities to calculate estimated position changes.

Each receiver sonobuoy 102x (and each stationary acoustic receiver 104x, if present) receives acoustic signals 201/219/299 (and 203, if present) originating from multiple source sonobuoys 101 (and stationary acoustic sources 103, if present). Distinguishing which acoustic signal originates from which acoustic source typically is useful for improving accuracy of estimated relative or absolute positions or velocities of sonobuoys 101/102, stationary devices 103/104, or target object 99. To achieve such improvements, in some examples, each acoustic signal 201x (or acoustic signal 203x, if present) is identifiable as coming from a specific corresponding source sonobuoy 101x (or stationary acoustic source 103x, if present). In other such examples, that identification is based at least in part on measurements or estimates of arrival time or signal direction for incoming acoustic signals. In some such examples, each of the source sonobuoys 101 or stationary acoustic sources 103x imparts a source-specific modulation or encoding onto the corresponding one of the acoustic signals 201 or 203. That modulation or encoding can enable the control unit 150 to identify specific portions of the received electromagnetic signals 302 as arising from a specific corresponding source sonobuoy 101x or stationary acoustic source 103x. Instead, or in addition, the relative or absolute velocity estimated for each source sonobuoy 101x and each receiver sonobuoy 102x can be used to identify signal portions attributable to each of the source sonobuoys 101. For example, if a Doppler shift exhibited by a given signal portion is too far from the shift expected based on the estimated relative or absolute velocity of a given source sonobuoy, then that source sonobuoy can be eliminated as having produced the corresponding acoustic signal.

In some examples, the acoustic signals 203 emitted by the stationary acoustic sources 103, or the signals 304 emitted by the stationary acoustic receivers 104, can be disguised as another natural or artificial sound one might expect to occur in the body of water. For example, an acoustic signal 203x can be disguised as noise emanating from a sea animal, a geologic or oceanographic sound, or noise emanating from a surface or submarine vessel (crewed or crewless).

Multiple received acoustic signals upon which a given calculation is based need not have been received simultaneously. In some instances a given calculation can be based on acoustic signals received at different times. In particular, velocities of drifting sonobuoys typically do not vary rapidly, so velocities estimated at different times for different sonobuoys can nevertheless be incorporated into a given calculation.

In some instances: (i) not every acoustic signal 201x necessarily reaches every receiver sonobuoy 102x, (ii) not every acoustic signal 201x necessarily reaches target object 99, stationary receivers 104x (if present), or bathymetric feature 19 (if applicable), (iii) not every acoustic signal 299x, 203x (if present), or 219x (if applicable) necessarily reaches every receiver sonobuoy 102x, (iv) not every acoustic signal 103x (if present) necessarily reaches every receiver sonobuoy 102x, or (v) not every electromagnetic signal 302x necessarily reaches control unit 150. Even when one or more of those conditions are present, the inventive systems and methods disclosed herein can still be implemented, and such instances and implementations shall nevertheless fall within the scope of the present disclosure and one or more of the appended claims.

The systems and methods disclosed herein, including control unit 150, can be implemented as general or special purpose computers or servers or other programmable hardware devices programmed through software, or as hardware or equipment "programmed" through hard wiring, or a combination of the two. A "computer" or "control unit" can comprise a single processor, processor core, or machine or can comprise multiple interacting processors, processor cores, or machines (located at a single location or at multiple locations remote from one another). A computer memory or computer-readable medium can be encoded with a computer program, so that execution of that program by one or more computers or processors causes the one or more computers to perform one or more of the methods, or portions thereof, disclosed herein. Suitable media can include temporary or permanent storage or replaceable media, such as network-based or Internet-based or otherwise distributed storage of software modules that operate together, RAM, ROM, CD ROM, CD-R, CD-R/W, DVD ROM, DVD±R, DVD±R/W, hard drives, solid state drives, thumb drives, flash memory, optical media, magnetic media, semiconductor media, or other current or future storage alternatives.

In addition to the preceding, the following examples fall within the scope of the present disclosure or appended claims:

Example 1

A method for estimating one or more sonobuoy positions or velocities in a multistatic active coherent sonar system including a set of multiple source sonobuoys floating in or on a body of water, a set of multiple receiver sonobuoys floating in or on a body of water, two or more stationary acoustic devices in the body of water, and a control unit having one or more programmed electronic processors, wherein the two or more stationary acoustic devices include (i) two or more stationary acoustic sources or (ii) two or more stationary acoustic receivers, the method comprising: (a) receiving at the control unit, from one or more of the multiple receiver sonobuoys, a set of receiver electromagnetic signals, wherein the set of receiver electromagnetic signals includes one or more signal portions representative of or derived from (i) two or more corresponding acoustic signals emitted or received by at least two of the two or more stationary acoustic devices and (ii) two or more corresponding acoustic signals received by one or more of the multiple receiver sonobuoys via direct propagation within the body of water; and (b) using the one or more electronic processors of the control unit to calculate, based at least in part on the representative or derived signal portions of the set of receiver electromagnetic signals received by the control unit, an estimated absolute or relative velocity or an estimated absolute or relative position for one or more of the multiple receiver sonobuoys.

Example 2

The method of Example 1 wherein: (c) the two or more stationary acoustic devices include two or more stationary acoustic sources; and (d) the set of receiver electromagnetic signals includes one or more signal portions representative of or derived from corresponding acoustic signals emitted by the two or more stationary acoustic sources and received by one or more of the multiple receiver sonobuoys via direct propagation within the body of water.

Example 3

The method of any one of Examples 1 or 2 wherein corresponding acoustic signals emitted by the two or more stationary acoustic devices are disguised so as to resemble noise emanating from a sea animal, a natural geologic or oceanographic sound, or noise emanating from a surface or submarine vessel.

Example 4

The method of any one of Examples 1 through 3 wherein: (c) the two or more stationary acoustic devices include two or more stationary acoustic receivers; and (d) the set of receiver electromagnetic signals includes one or more signal portions representative of or derived from corresponding acoustic signals emitted by one or more of the multiple source sonobuoys and received by the two or more stationary acoustic receivers via direct propagation within the body of water.

Example 5

The method of any one of Examples 1 through 4 wherein the calculation of part (b) is based at least in part on estimated initial positions of one or more of the stationary acoustic devices, and the initial estimated positions are estimated locations of entry into the body of water of the one or more of the stationary acoustic devices.

Example 6

The method of any one of Examples 1 through 5 wherein the calculation of part (b) is based at least in part on improved estimated positions of one or more of the stationary acoustic devices, and the improved estimated positions are calculated based at least in part on (i) the initial estimated positions of the stationary acoustic devices and one or both of (ii) velocities of the stationary acoustic devices estimated as the stationary acoustic devices sink to a bottom surface of the body of water after deployment and emit or receive acoustic signals or (iii) positions of the stationary acoustic devices estimated as the stationary acoustic devices emit or receive acoustic signals after entry into the body of water.

Example 7

The method of any one of Examples 1 through 6 wherein: (c) the set of receiver electromagnetic signals includes one or more signal portions representative of or derived from corresponding pressure readings from corresponding pressure gauges of one or more of the stationary acoustic devices; and (d) the calculation of part (b) is based at least in part on the signal portions of part (c).

Example 8

A method for estimating one or more sonobuoy positions or velocities in a multistatic active coherent sonar system including a set of multiple source sonobuoys floating in or on a body of water, a set of multiple receiver sonobuoys floating in or on a body of water, and a control unit having one or more programmed electronic processors, the method comprising: (a) receiving at the control unit, from one or more of the multiple receiver sonobuoys, a set of receiver electromagnetic signals, wherein the set of receiver electromagnetic signals includes one or more signal portions representative of or derived from one or more corresponding acoustic signals emitted by one or more of the multiple source sonobuoys and received by one or more of the multiple receiver sonobuoys via corresponding acoustic pathways through the body of water, wherein the corresponding acoustic pathways include four or more distinct acoustic pathways through the body of water, at least three of which distinct acoustic pathways include reflection or scattering from one or more bathymetric features in the body of water; and (b) using the one or more electronic processors of the control unit to calculate, based at least in part on the representative or derived signal portions of the set of receiver electromagnetic signals received by the control unit, an estimated absolute or relative velocity or an estimated absolute or relative position for one or more of the multiple receiver sonobuoys.

Example 9

The method of Example 8 wherein the one or more bathymetric features include a seamount, a guyot, an underwater canyon, or other natural bathymetric feature.

Example 10

The method of any one of Examples 8 or 9 wherein the one or more bathymetric features include an acoustic reflector deployed on a bottom surface of the body of water.

Example 11

The method of any one of Examples 1 through 10 wherein the set of receiver electromagnetic signals includes one or more signal portions representative of or derived from one or more corresponding acoustic signals emitted by one or more of the multiple source sonobuoys and received by one or more of the multiple receiver sonobuoys via direct propagation within the body of water.

Example 12

The method of Example 11 further comprising using the one or more electronic processors of the control unit to calculate, based at least in part on the representative or derived signal portions of the set of receiver electromagnetic signals received by the control unit, an estimated absolute or relative position or an estimated absolute or relative velocity of one or more of the multiple source sonobuoys.

Example 13

The method of Example 12 wherein the set of receiver electromagnetic signals includes one or more signal portions representative of or derived from one or more corresponding acoustic signals emitted by one or more of the multiple source sonobuoys and received by one or more of the multiple receiver sonobuoys via reflection or scattering from a target object in or on the body of water, the method further comprising using the one or more electronic processors of the control unit to calculate, based at least in part on the representative or derived signal portions of the set of receiver electromagnetic signals received by the control unit, an estimated absolute or relative position or an estimated absolute or relative velocity of the target object.

Example 14

The method of any one of Examples 1 through 13 wherein estimated relative or absolute velocities or estimated relative or absolute positions are calculated without relying on extrinsic positioning signals acquired for each sonobuoy after initial deployment of that sonobuoy.

Example 15

The method of any one of Examples 1 through 14 wherein the calculation of part (b) is based at least in part on estimated initial positions of one or more of the multiple source or receiver sonobuoys, and the initial estimated positions are estimated locations of entry of the one or more of the multiple source or receiver sonobuoys into the body of water.

Example 16

The method of any one of Examples 1 through 15 wherein estimated positions of one or more of the multiple source or receiver sonobuoys are calculated based at least in part on (i) the estimated initial positions of one or more of the multiple source or receiver sonobuoys and (ii) velocities of one or more of the multiple source or receiver sonobuoys as the multiple source and receiver sonobuoys drift in or on the body of water after initial deployment.

Example 17

The method of any one of Examples 1 through 16 wherein each source acoustic signal is modulated or encoded, the method further comprising, using the control unit, identifying, for each signal portion included in the one or more receiver electromagnetic signals, based at least in part on modulation or encoding of the source acoustic signals, a corresponding one of the multiple source sonobuoys that produced the corresponding source acoustic signal represented by that signal portion or from which that signal portion is derived.

Example 18

The method of any one of Examples 1 through 17 further comprising identifying for each signal portion included in the one or more receiver electromagnetic signals, using the control unit, based at least in part on the set of corresponding estimated velocities for the source and receiver sonobuoys, a corresponding one of the multiple source sonobuoys that produced the corresponding source acoustic signal represented by that signal portion or from which that signal portion is derived.

Example 19

The method of any one of Examples 1 through 18 further comprising deploying the source and receiver sonobuoys from an aircraft.

Example 20

The method of any one of Examples 1 through 19 wherein the control unit is contained in an aircraft.

Example 21

The method of any one of Examples 1 through 20 further comprising deploying the source and receiver sonobuoys from an aircraft, wherein the control unit is contained in the aircraft.

Example 22

The method of any one of Examples 1 through 21 wherein calculation of an estimated position or velocity can employ one or more of time delays, time differences of arrival, Doppler shifts, matched filters, CTCE, SBE, Bayesian methods, any computation technique disclosed in the appendices, or any computation technique disclosed in any of the references incorporated herein.

Example 23

A multistatic active coherent sonar system comprising: (a) a set of multiple source sonobuoys floating in or on a body of water, (b) a set of multiple receiver sonobuoys floating in or on a body of water, and (c) a control unit having one or more programmed electronic processors programmed to perform the method of any one of Examples 8 through 22.

Example 24

A multistatic active coherent sonar system comprising: (a) a set of multiple source sonobuoys floating in or on a body of water, (b) a set of multiple receiver sonobuoys floating in or on a body of water, (c) two or more stationary acoustic devices in the body of water, the two or more stationary acoustic devices including (i) two or more stationary acoustic sources or (ii) two or more stationary acoustic receivers, and (d) a control unit having one or more programmed electronic processors programmed to perform the method of any one of Examples 1 through 7 or 11 through 22.

It is intended that equivalents of the disclosed example embodiments and methods shall fall within the scope of the present disclosure. It is intended that the disclosed example embodiments and methods, and equivalents thereof, may be modified while remaining within the scope of the present disclosure.

In the foregoing Detailed Description, various features may be grouped together in several example embodiments for the purpose of streamlining the disclosure. This method of disclosure is not to be interpreted as reflecting an intention that any subsequently claimed embodiment requires more features than are expressly recited in the corresponding claim. Rather, inventive subject matter may lie in less than all features of a single disclosed example embodiment. The present disclosure shall be construed as implicitly disclosing any embodiment having any suitable set of one or more disclosed features (i.e., a set of features that are neither incompatible nor mutually exclusive) that appear in the present disclosure, including those sets that may not be explicitly disclosed herein.

For purposes of the present disclosure, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure, the words "comprising," "including," "having," and variants thereof, wherever they appear, shall be construed as open ended terminology, with the same meaning as if the phrase "at least" were appended after each instance thereof, unless explicitly stated otherwise. For purposes of the present disclosure, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed system or method, the overall behavior or performance of the system or method does not differ from that which would have occurred had the null quantity in fact been completely removed, exactly equal to zero, or otherwise exactly nulled. For purposes of the present disclosure, "velocity" refers to the speed of an object in a specific direction (i.e., a vector), as opposed to speed absent a direction (i.e., a scalar).

In the description and claims, any labelling of elements, steps, limitations, or other portions (e.g., first, second, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited or, in some instances, it will be implicit or inherent based on the specific content of the description or claim. In the appended claims, if the provisions of USC 35 § 112(f) are desired or intended to be invoked in an apparatus claim, then the word "means" will appear in that apparatus claim. If those provisions are desired or intended to be invoked in a method claim, the words "a step for" will appear in that method claim. Conversely, if the words "means" or "a step for" do not appear in a claim, then the provisions of 35 USC § 112(f) are not desired or intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of the subject matter encompassed by each claim shall be determined by the recitation of only that claim.

APPENDICES

The first appendix is a redacted copy of a White Paper entitled "Techniques for improving target location and detection for MAC" submitted by the inventor of the instant application to the United States Navy on 20 Apr. 2015.

The second appendix is a derivation of a bistatic or multistatic Doppler estimation technique.

The third appendix is a technical note entitled "Estimate Buoy Velocities: Fixed Sources or Fixed Receivers."

The fourth appendix is a technical note entitled "Estimate Buoy Velocities: Reflections from Bathymetry."

The fifth appendix is computer code (MatLab®) for one implementation of the methods described in the fourth appendix.

©2017 Scientific Innovations, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for calculating an estimated absolute or relative velocity or absolute or relative position of one or more receiver sonobuoys, in a multistatic active coherent sonar system including a set of multiple source sonobuoys floating in or on a body of water, a set of multiple receiver sonobuoys floating in or on a body of water, and a control unit having one or more programmed electronic processors, the method comprising:

(a) receiving at the control unit, from one or more of the multiple receiver sonobuoys, a set of receiver electromagnetic signals, wherein the set of receiver electromagnetic signals includes one or more signal portions representative of or derived from one or more corresponding acoustic signals emitted by one or more of the multiple source sonobuoys and received by one or more of the multiple receiver sonobuoys via corresponding acoustic pathways through the body of water, wherein the corresponding acoustic pathways include four or more distinct acoustic pathways through the body of water, at least three of which distinct acoustic pathways include reflection or scattering from one or more bathymetric features in the body of water; and (b) using the one or more electronic processors of the control unit to calculate, based at least in part on the representative or derived signal portions of the set of receiver electromagnetic signals received by the control unit, an estimated absolute or relative velocity or an estimated absolute or relative position for one or more of the multiple receiver sonobuoys.

2. The method of claim 1 wherein the one or more bathymetric features include a seamount, a guyot, an underwater canyon, or other natural bathymetric feature.

3. The method of claim 1 wherein the one or more bathymetric features include an acoustic reflector deployed on a bottom surface of the body of water.

4. The method of claim 1 wherein the set of receiver electromagnetic signals includes one or more signal portions representative of or derived from one or more corresponding acoustic signals emitted by one or more of the multiple source sonobuoys and received by one or more of the multiple receiver sonobuoys via direct propagation within the body of water.

5. The method of claim 4 further comprising using the one or more electronic processors of the control unit to calculate, based at least in part on the representative or derived signal portions of the set of receiver electromagnetic signals received by the control unit, an estimated absolute or relative position or an estimated absolute or relative velocity of one or more of the multiple source sonobuoys.

6. The method of claim 1 wherein the set of receiver electromagnetic signals includes one or more signal portions representative of or derived from one or more corresponding acoustic signals emitted by one or more of the multiple source sonobuoys and received by one or more of the multiple receiver sonobuoys via reflection or scattering from a target object in or on the body of water, the method further comprising using the one or more electronic processors of the control unit to calculate, based at least in part on the representative or derived signal portions of the set of receiver electromagnetic signals received by the control unit, an estimated absolute or relative position or an estimated absolute or relative velocity of the target object.

7. The method of claim 6 wherein estimated relative or absolute velocities or estimated relative or absolute positions are calculated without relying on extrinsic positioning signals acquired for each sonobuoy after initial deployment of that sonobuoy.

8. The method of claim 1 wherein estimated relative or absolute velocities or estimated relative or absolute positions are calculated without relying on extrinsic positioning signals acquired for each sonobuoy after initial deployment of that sonobuoy.

9. The method of claim 1 wherein the calculation of part (b) is based at least in part on estimated initial positions of one or more of the multiple source or receiver sonobuoys, and the initial estimated positions are estimated locations of entry of the one or more of the multiple source or receiver sonobuoys into the body of water.

10. The method of claim 9 wherein estimated positions of one or more of the multiple source or receiver sonobuoys are calculated based at least in part on (i) the estimated initial positions of one or more of the multiple source or receiver sonobuoys and (ii) velocities of one or more of the multiple source or receiver sonobuoys as the multiple source and receiver sonobuoys drift in or on the body of water after initial deployment.

11. The method of claim 1 wherein each source acoustic signal is modulated or encoded, the method further comprising, using the control unit, identifying, for each signal portion included in the one or more receiver electromagnetic signals, based at least in part on modulation or encoding of the source acoustic signals, a corresponding one of the multiple source sonobuoys that produced the corresponding source acoustic signal represented by that signal portion or from which that signal portion is derived.

12. The method of claim 1 further comprising identifying for each signal portion included in the one or more receiver electromagnetic signals, using the control unit, based at least in part on the set of corresponding estimated velocities for the source and receiver sonobuoys, a corresponding one of the multiple source sonobuoys that produced the corresponding source acoustic signal represented by that signal portion or from which that signal portion is derived.

13. The method of claim 1 further comprising deploying the source and receiver sonobuoys from an aircraft.

14. The method of claim 1 wherein the control unit is contained in an aircraft.

15. The method of claim 1 further comprising deploying the source and receiver sonobuoys from an aircraft, wherein the control unit is contained in the aircraft.

16. A multistatic active coherent sonar system comprising:
(a) a set of multiple source sonobuoys floating in or on a body of water,
(b) a set of multiple receiver sonobuoys floating in or on a body of water, and
(c) a control unit having one or more programmed electronic processors programmed to calculate an estimated absolute or relative velocity or an estimated absolute or relative position for one or more of the multiple receiver sonobuoys based at least in part on one or more signal portions of a set of receiver electromagnetic signals received by the control unit from one or more of the multiple receiver sonobuoys, which signal portions are representative of or derived from one or more corresponding acoustic signals emitted by one or more of the multiple source sonobuoys and received by one or more of the multiple receiver sonobuoys via corresponding acoustic pathways through the body of water, wherein the corresponding acoustic pathways include four or more distinct acoustic pathways through the body of water, at least three of which distinct acoustic pathways include reflection or scattering from one or more bathymetric features in the body of water.

17. The sonar system of claim 16 wherein the one or more bathymetric features include a seamount, a guyot, an underwater canyon, or other natural bathymetric feature.

18. The sonar system of claim 16 further comprising an acoustic reflector deployed on a bottom surface of the body of water, and wherein the one or more bathymetric features include the acoustic reflector.

19. The sonar system of claim 16 wherein the set of receiver electromagnetic signals includes one or more signal portions representative of or derived from one or more corresponding acoustic signals emitted by one or more of the multiple source sonobuoys and received by one or more of the multiple receiver sonobuoys via direct propagation within the body of water.

20. The sonar system of claim 19 wherein the one or more electronic processors of the control unit is further programmed to calculate, based at least in part on the representative or derived signal portions of the set of receiver electromagnetic signals received by the control unit, an estimated absolute or relative position or an estimated absolute or relative velocity of one or more of the multiple source sonobuoys.

21. The sonar system of claim 16 wherein the set of receiver electromagnetic signals includes one or more signal portions representative of or derived from one or more corresponding acoustic signals emitted by one or more of the multiple source sonobuoys and received by one or more of the multiple receiver sonobuoys via reflection or scattering from a target object in or on the body of water, and wherein the one or more electronic processors of the control unit is further programmed to calculate, based at least in part on the representative or derived signal portions of the set of receiver electromagnetic signals received by the control unit, an estimated absolute or relative position or an estimated absolute or relative velocity of the target object.

22. The sonar system of claim 21 wherein the one or more electronic processors of the control unit is programmed to calculate estimated relative or absolute velocities or estimated relative or absolute positions without relying on extrinsic positioning signals acquired for each sonobuoy after initial deployment of that sonobuoy.

23. The sonar system of claim 16 wherein the one or more electronic processors of the control unit is programmed to calculate estimated relative or absolute velocities or estimated relative or absolute positions without relying on extrinsic positioning signals acquired for each sonobuoy after initial deployment of that sonobuoy.

24. The sonar system of claim 16 wherein the one or more electronic processors of the control unit is programmed to calculate an estimated absolute or relative velocity or an estimated absolute or relative position for one or more of the multiple receiver sonobuoys, based at least in part on estimated initial positions of one or more of the multiple source or receiver sonobuoys, and the initial estimated positions are estimated locations of entry of the one or more of the multiple source or receiver sonobuoys into the body of water.

25. The sonar system of claim 24, wherein the one or more electronic processors of the control unit is programmed to calculate the estimated positions of one or more of the multiple source or receiver sonobuoys based at least in part on (i) the estimated initial positions of one or more of the multiple source or receiver sonobuoys and (ii) velocities of one or more of the multiple source or receiver sonobuoys as the multiple source and receiver sonobuoys drift in or on the body of water after initial deployment.

26. The sonar system of claim 16 wherein each source acoustic signal is modulated or encoded, and the one or more electronic processors of the control unit is further programmed to identify, for each signal portion included in the one or more receiver electromagnetic signals, based at least in part on modulation or encoding of the source acoustic signals, a corresponding one of the multiple source sonobuoys that produced the corresponding source acoustic signal represented by that signal portion or from which that signal portion is derived.

27. The sonar system of claim 16 wherein the one or more electronic processors of the control unit is further programmed to identify, for each signal portion included in the one or more receiver electromagnetic signals, based at least in part on the set of corresponding estimated velocities for the source and receiver sonobuoys, a corresponding one of the multiple source sonobuoys that produced the corresponding source acoustic signal represented by that signal portion or from which that signal portion is derived.

28. The sonar system of claim 16 wherein the control unit is contained in an aircraft.

\* \* \* \* \*